(12) United States Patent
Matsumoto et al.

(10) Patent No.: US 12,437,923 B2
(45) Date of Patent: Oct. 7, 2025

(54) MULTILAYER CERAMIC ELECTRONIC DEVICE WITH ZIRCONIUM

(71) Applicant: TAIYO YUDEN CO., LTD., Tokyo (JP)

(72) Inventors: Yasuhiro Matsumoto, Tokyo (JP); Koichiro Morita, Tokyo (JP); Yuta Fuse, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 57 days.

(21) Appl. No.: 17/974,438

(22) Filed: Oct. 26, 2022

(65) Prior Publication Data

US 2023/0154681 A1   May 18, 2023

(30) Foreign Application Priority Data

Nov. 17, 2021  (JP) .................................. 2021-187385

(51) Int. Cl.
*H01G 4/12* (2006.01)
*H01G 4/30* (2006.01)

(52) U.S. Cl.
CPC ............. *H01G 4/1245* (2013.01); *H01G 4/30* (2013.01)

(58) Field of Classification Search
CPC ...... H01G 4/1245; H01G 4/30; H01G 4/1227; H01G 4/33; C04B 35/638; C04B 2235/3224; C04B 2235/3244; C04B 2235/3262; C04B 2235/3418; C04B 2235/652; C04B 2235/6567; C04B 2235/662; C04B 2235/663; C04B 2237/346; C04B 2237/68; C04B 2237/704; C04B 35/468
See application file for complete search history.

(56) References Cited

U.S. PATENT DOCUMENTS

| 4,066,426 A | * | 1/1978 | Maher ................. C04B 35/4682 65/17.5 |
| 4,120,677 A | * | 10/1978 | Burn .................... C04B 35/4682 264/681 |
| 4,335,216 A | * | 6/1982 | Hodgkins ........... C04B 35/4684 501/138 |

(Continued)

FOREIGN PATENT DOCUMENTS

DE            3915339 A1 *  11/1989
JP      2007-145649 A      6/2007
(Continued)

*Primary Examiner* — Timothy J. Dole
*Assistant Examiner* — Daniel M Dubuisson
(74) *Attorney, Agent, or Firm* — CHEN YOSHIMURA LLP (57) ABSTRACT

A multilayer ceramic electronic device includes a plurality of internal electrode layers that face each other; and a plurality of dielectric layers, each of which is sandwiched by each two of the plurality of internal electrode layers. A main component of the plurality of dielectric layers is barium titanate zirconate. In each of the plurality of dielectric layers, an amount of zirconium is 2 at % or more and 14 at % or less with respect a total amount of titanium and zirconium. Curie point of the plurality of dielectric layers is less than 85 degrees C. An average thickness of each of the plurality of dielectric layers is 1 μm or less.

12 Claims, 7 Drawing Sheets

(56) References Cited

U.S. PATENT DOCUMENTS

| | | | | |
|---|---|---|---|---|
| 4,379,854 | A * | 4/1983 | Soong | H01G 4/1227 361/321.5 |
| 5,014,158 | A * | 5/1991 | Nishimura | C04B 35/49 29/25.42 |
| 5,361,187 | A * | 11/1994 | Srinivasan | C04B 35/49 361/321.1 |
| 5,672,378 | A * | 9/1997 | Maher | C04B 41/88 264/618 |
| 2006/0232910 | A1 * | 10/2006 | Megherhi | H01G 4/30 361/321.4 |
| 2007/0227641 | A1 * | 10/2007 | Skamser | B32B 18/00 156/89.12 |
| 2009/0310279 | A1 | 12/2009 | Sasabayashi et al. | |
| 2011/0205687 | A1 | 8/2011 | Inoue et al. | |
| 2012/0162854 | A1 | 6/2012 | Iwanaga | |
| 2013/0063862 | A1 * | 3/2013 | Kim | H01G 4/30 156/182 |
| 2018/0182549 | A1 | 6/2018 | Koide et al. | |
| 2019/0333698 | A1 | 10/2019 | Sugita | |

FOREIGN PATENT DOCUMENTS

| | | |
|---|---|---|
| JP | 2012-138502 A | 7/2012 |
| JP | 2018-107413 A | 7/2018 |
| JP | 2019-192862 A | 10/2019 |
| WO | 2008/105240 A1 | 9/2008 |
| WO | 2010/047181 A1 | 4/2010 |

* cited by examiner

MULTILAYER CERAMIC ELECTRONIC DEVICE WITH ZIRCONIUM

FIELD

A certain aspect of the present disclosure relates to a multilayer ceramic electronic device and a manufacturing method of the multilayer ceramic electronic device.

BACKGROUND

Multilayer ceramic electronic components are used in high frequency communication systems such as mobile phones. For example, multilayer ceramic capacitors are used to remove noise (see, for example, Patent Documents 1-5).

PRIOR ART

Patent Document

Document 1: Japanese Patent Application Publication No. 2007-145649

Document 2: Japanese Patent Application Re-Publication No. 2008-105240

Document 3: Japanese Patent Application Re-Publication No. 2010-047181

Document 4: Japanese Patent Application Publication No. 2018-107413

Document 5: Japanese Patent Application Publication No. 2019-192862

SUMMARY OF THE INVENTION

In mobile products such as mobile phones, smaller (thinner) and larger multilayer ceramic electronic components are required.

As power saving of various electronic devices is progressing, the AC (alternating current) input level to multilayer ceramic electronic devices is becoming smaller. However, as the AC input level decreases, the electrostatic capacity of the multilayer ceramic electronic device also decreases. Therefore, the multilayer ceramic electronic device has a problem that the performance is deteriorated in the low voltage circuit. In order to efficiently remove weak noise, there is a demand for multilayer ceramic electronic devices whose capacity does not decrease under low AC voltage.

The present invention has a purpose of providing a multilayer ceramic electronic device having a high capacity under low AC voltage.

According to a first aspect of the embodiments, there is provided a multilayer ceramic electronic device including: a plurality of internal electrode layers that face each other; and a plurality of dielectric layers, each of which is sandwiched by two of the plurality of internal electrode layers, wherein a main component of the plurality of dielectric layers is barium titanate zirconate, wherein in each of the plurality of dielectric layers, an amount of zirconium is 2 at % or more and 14 at % or less with respect a total amount of titanium and zirconium, wherein Curie point of the plurality of dielectric layers is less than 85 degrees C., and wherein an average thickness of each of the plurality of dielectric layers is 1 µm or less.

The amount of zirconium in the plurality of dielectric layers may be 8 at % or less with respect the total amount of titanium and zirconium.

The Curie point of the plurality of dielectric layers may be 80 degrees C. or less.

The Curie point of the plurality of dielectric layers may be 50 degrees C. or less.

A capacity of the multilayer ceramic electronic device at 10 mVrms may be larger than that at 1 Vrms under an AC voltage condition.

The plurality of dielectric layers may include manganese, silicon, or a rare earth element.

According to a second aspect of the embodiments, there is provided a multilayer ceramic electronic device including: a multilayer chip having a plurality of internal electrode layers that face each other and a plurality of dielectric layers, each of which is sandwiched by two of the plurality of internal electrode layers, the plurality of dielectric layers forming a capacity section in which the plurality of internal electrode layers face each other; and an external electrode that is provided on a face of the multilayer chip and is electrically connected to a part of the plurality of internal electrode layers, wherein a main component of the plurality of dielectric layers is barium titanate zirconate, wherein in each of the plurality of dielectric layers, an amount of zirconium in the capacity section is 2 at % or more and 14 at % or less with respect a total amount of titanium and zirconium, wherein Curie point of the plurality of dielectric layers in the capacity section is less than 85 degrees C., and wherein an average thickness of each of the plurality of dielectric layers is 1 µm or less.

The amount of zirconium in the plurality of dielectric layers in the capacity section may be 8 at % or less with respect the total amount of titanium and zirconium.

The Curie point of the plurality of dielectric layers in the capacity section may be 80 degrees C. or less.

The Curie point of the plurality of dielectric layers in the capacity section may be 50 degrees C. or less.

A capacity of the multilayer ceramic electronic device at 10 mVrms may be larger than that at 1 Vrms under an AC voltage condition.

The plurality of dielectric layers in the capacity section may include manganese, silicon, or a rare earth element.

According to a third aspect of the embodiments, there is provided a manufacturing method of a multilayer ceramic electronic device including: forming a plurality of dielectric green sheets, each of which includes zirconium of 2 at % or more and 14 at % or less with respect to a total amount of titanium and zirconium, a main component of the plurality of dielectric green sheets being barium titanate zirconate; forming an internal electrode patterns on each of the plurality of dielectric green sheets by using a conductive paste, thereby forming the plurality of dielectric green sheets on which a plurality of the internal electrodes patterns are respectively formed; forming a multilayer structure by stacking the plurality of dielectric green sheets on which the plurality of internal electrode patterns have been respectively formed; forming a plurality of dielectric layers and a plurality of internal electrode layers from the plurality of dielectric green sheets and the plurality of internal electrode patterns by a firing process of firing the multilayer structure, each of the plurality of dielectric layers having an average thickness of 1 µm or less; and annealing the plurality of dielectric layers so that Curie point of the plurality of dielectric layers becomes less than 85 degrees C.

The annealing may be performed for 30 minutes to 3 hours in a reductive atmosphere at 1100 degrees C. to 1200 degrees C.

The method may further include applying a metal paste to side edges of the internal electrode pattern on each of the dielectric green sheets, before the firing process.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DETAILED DESCRIPTION

Hereinafter, an exemplary embodiment will be described with reference to the accompanying drawings.

Exemplary Embodiments

Figure 1:
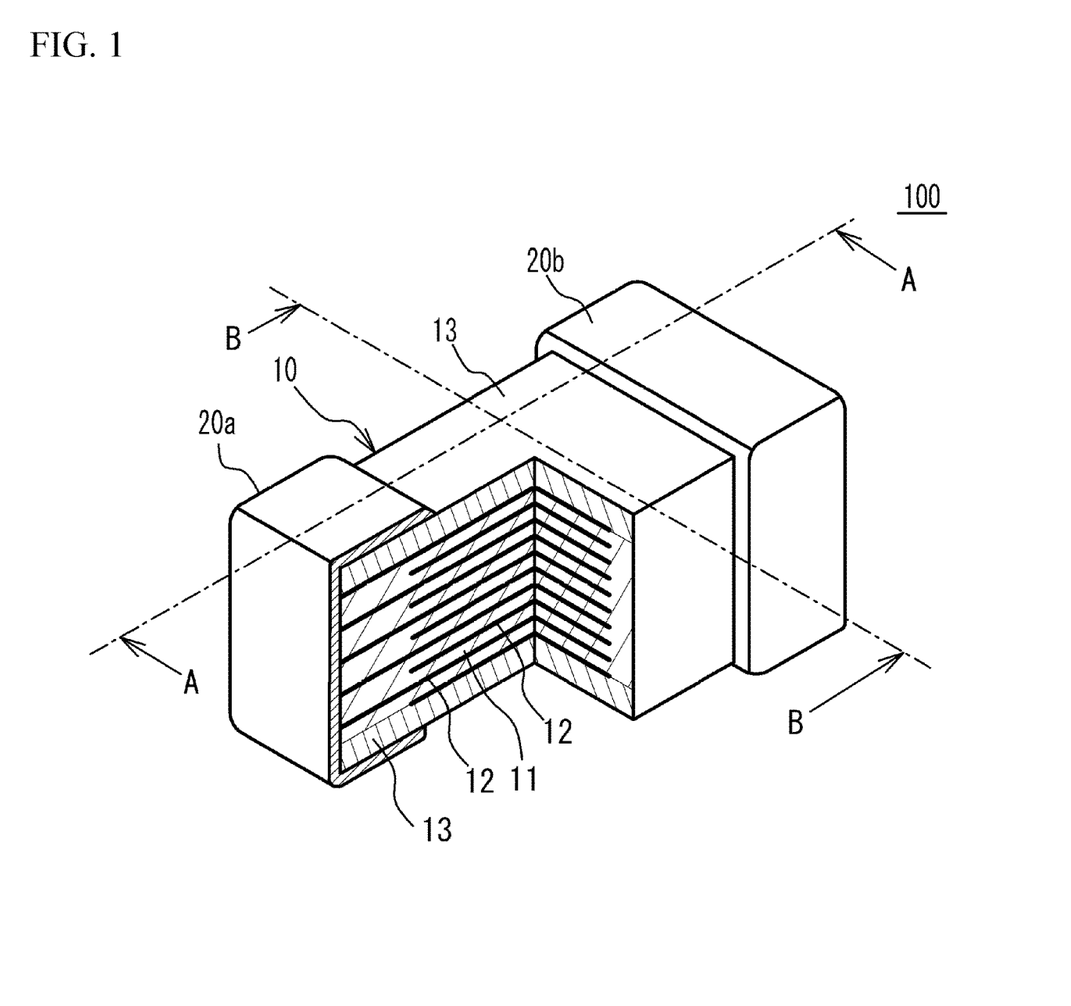
FIG. 1 is a partial cross-sectional perspective view of a multilayer ceramic capacitor.
Figure 2:
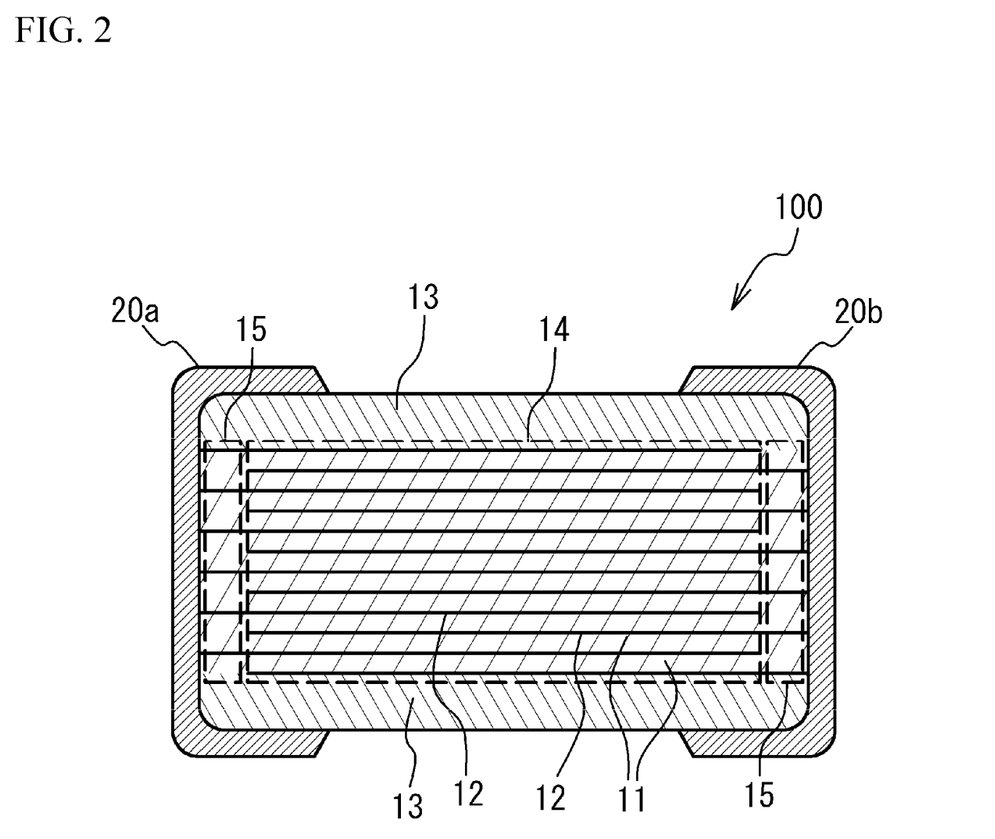
FIG. 2 is a cross-sectional view taken along line A-A in FIG. 1.
Figure 3:
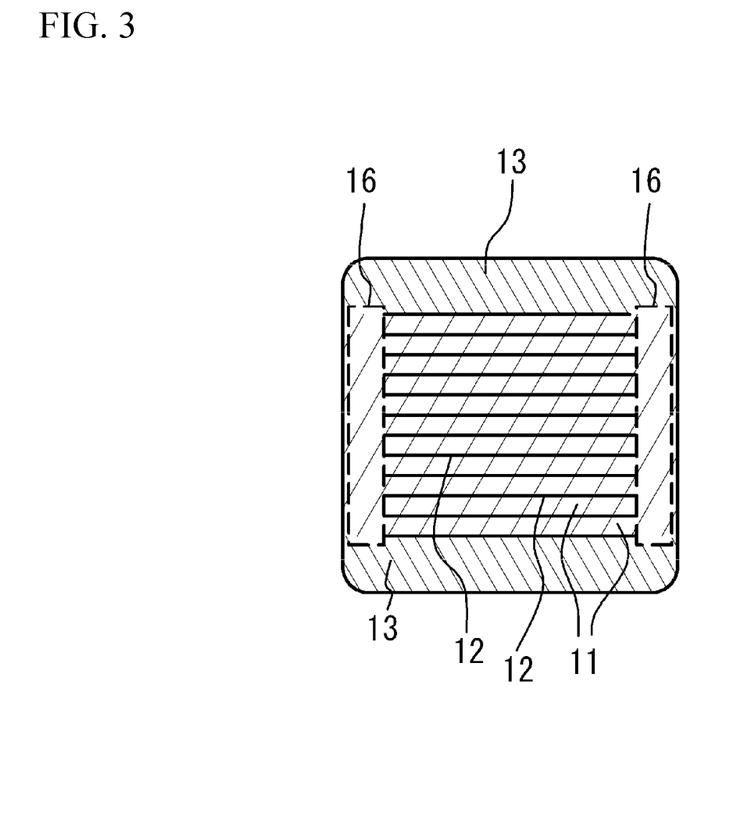
FIG. 3 is a cross-sectional view taken along line B-B in FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two end faces of the multilayer chip 10 opposite to each other. Among four faces other than the two end faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 contains a ceramic material acting as a dielectric material. The internal electrode layer 12 contains a base metal. End edges of the internal electrode layers 12 are alternately exposed to a first end face of the multilayer chip 10 and a second end face of the multilayer chip 10 that is different from the first end face. The external electrode 20a is provided on the first end face. The external electrode 20b is provided on the second end face. Thus, the internal electrode layers 12 are alternately electrically connected to the external electrode 20a and the external electrode 20b. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

The dielectric layer 11 contains, for example, a ceramic material having a perovskite structure represented by the general formula $ABO_3$ as a main component. The perovskite structure contains $ABO_{3-\alpha}$, which deviates from the stoichiometric composition. Barium titanate zirconate is used as the ceramic material. For example, in the dielectric layer 11, barium titanate titanate is contained in an amount of 90 at % or more.

Additives may be added to the dielectric layer 11. As additives to the dielectric layer 11, an oxide of magnesium (Mg), manganese (Mn), molybdenum (Mo), vanadium (V), chromium (Cr), or a rare earth element (itrium (Y), samarium (Sm), europium (Eu), gadolinium (Gd), terbium (Tb), displosium (Dy), horomium (Ho), erbium (Er), turium (Tm) and itterbium (Yb), or an oxide of cobalt (Co), nickel (Ni), lithium (Li), boron (B), sodium (Na), potassium (K) or silicon (Si), or a glass including cobalt, nickel, lithium, boron, sodium, potassium or silicon.

The main component of the internal electrode layer 12 may be a base metal such as nickel or a noble metal.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin section 15. The section where the internal electrode layers 12 connected to the external electrode 20b face each other with no internal electrode layer 12 connected to the external electrode 20a interposed therebetween is another end margin section 15. That is, the end margin section 15 is a section where the internal electrode layers 12 connected to one of the external electrodes face each other with no internal electrode layer 12 connected to the other of the external electrodes interposed therebetween. The end margin section 15 is a section where no capacity is generated.

As illustrated in FIG. 3, in the multilayer chip 10, a section from one of the two side faces of the multilayer chip 10 to lateral side edges of the internal electrode layers 12 is referred to as a side margin section 16. That is, each of the side margin sections 16 is a section that covers the lateral side edges, extending toward one of the side faces of the multilayer structure, of the stacked internal electrode layers 12. The side margin section 16 is a section where no capacity is generated.

Generally, in a ferroelectric substance, the electric flux density responds non-linearly to the electric field strength. Therefore, the ferroelectric substance has a change in permittivity (AC voltage characteristic) with respect to the input level of AC (alternating current). When the electric field is small with respect to the coercive electric field of the ferroelectric substance, the ferroelectric substance cannot be sufficiently polarized and inverted, and the ferroelectric substance indicates a low dielectric constant. Ferroelectrics exhibit the maximum permittivity because many polarizations can be reversed with a small electric field when the electric field is comparable to the coercive electric field. When the electric field is further increased, the polarization that can be reversed is saturated for the increased electric field and does not increase so much, so that the ferroelectric substance exhibits a low dielectric constant. Therefore, the AC characteristics of the multilayer ceramic capacitor using the ferroelectric material follow the process of having the maximum peak of low capacity high capacity low capacity as the voltage increases from a small voltage.

The present inventors have found that the capacity change rate at a low voltage is improved by using the main component ceramic of the dielectric layer 11 as a composition to which Zr is added. Although the cause of this has not been completely elucidated, it is presumed that this is because when zirconium dissolves in barium titanate to barium titanate $(Ba (Ti, Zr) O_3)$, the Curie point Tc decreases, and it accompanies decreasing of the coercive electric field, and the peak of high capacity shifts to the low electric field side. Therefore, the lower the Curie point Tc, the more advantageous for improving the AC characteristics. Further, since the ceramic becomes a normal dielectric at a temperature higher than the Curie point Tc, the dielectric constant at the low voltage limit becomes the largest. Therefore, it is desirable that the Curie point Tc is less than 85° C. for a multilayer ceramic capacitor having a guaranteed temperature of 85° C. or lower.

From the viewpoint of sufficiently lowering the Curie point Tc of the dielectric layer 11, a lower limit is set for the amount of zirconium added to titanium. As explained below with reference to working Examples, the amount of zirconium added to titanium is 2 at % or more. The amount of zirconium added to titanium is preferably 3 at % or more, and more preferably 4 at % or more. The amount of zirconium added to the total amount of titanium and zirconium is the amount of zirconium added (at %) when the total amount of titanium and zirconium is 100 at %.

On the other hand, if there is too much zirconium in the dielectric layer 11, the relative permittivity of the dielectric layer 11 may decrease. Therefore, an upper limit is set on the amount of zirconium added to the total amount of titanium and zirconium. In this embodiment, the amount of zirconium added to the total of titanium and zirconium is 14 at % or less. The amount of zirconium added to the total of titanium and zirconium is preferably 10 at % or less, more preferably 8 at % or less.

However, it is not enough to adjust the composition of the dielectric. And it is not possible to realize a multilayer ceramic capacitor having a capacity higher than that of a normal AC voltage (for example, 1 Vrms) under a low AC voltage (for example, 10 mVrms). Therefore, the average thickness of the dielectric layer 11 of the multilayer ceramic capacitor 100 is reduced to 1 μm or less. By thinning the dielectric layer 11, even if the same voltage is applied to the multilayer ceramic capacitor 100, the electric field strength applied to the dielectric layer 11 becomes large. Therefore, when the average thickness is 1 μm or less, the capacity under normal measurement conditions (for example, 1 Vrms) becomes low because the electric field is higher than the coercive electric field, and the capacity under low AC voltage (for example, 10 mVrms) of the multilayer ceramic capacitor 100 is relatively large.

The average thickness of the dielectric layer 11 is measured by observing the cross section of the multilayer ceramic capacitor 100 with an SEM, measuring the thickness of the dielectric layer 11 at about 100 points, and deriving the average value of all the measurement points.

The average thickness of the dielectric layer 11 is preferably 0.9 μm or less, more preferably 0.8 μm or less.

It is preferable that the Curie point Tc of the dielectric layer 11 is low from the viewpoint of suppressing a decrease in capacity at a low voltage. For example, the Curie point Tc of the dielectric layer 11 is preferably 80° C. or lower, and more preferably 50° C. or lower. The Curie point Tc of the dielectric layer 11 can be adjusted by the amount of zirconium added, but can be adjusted by the amount of other additives added in addition to zirconium. For example, the Curie point Tc can be further reduced by adding manganese, silicon, or a rare earth element such as holmium, terbium, dysprosium, yttrium, erbium, or ytterbium as an additive.

Figure 4:
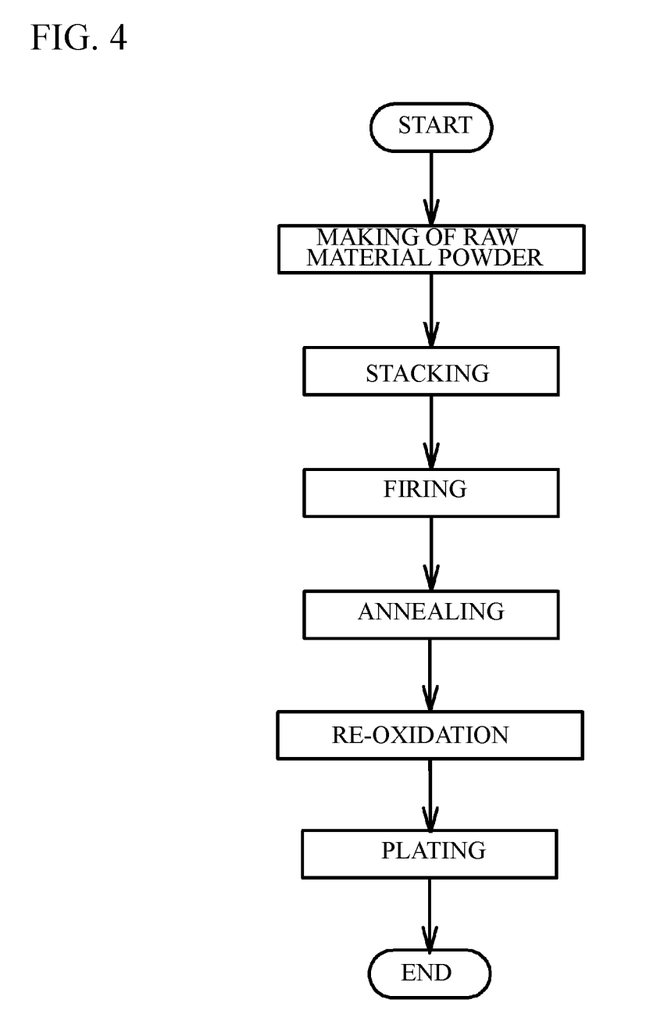
FIG. 4 is a flowchart of a manufacturing method of a multilayer ceramic capacitor of a first embodiment.

Next, a description will be given of a manufacturing method of the multilayer ceramic capacitors 100. FIG. 4 illustrates a manufacturing method of the multilayer ceramic capacitor 100.

(Making process of raw material powder) A powder material of barium titanate zirconate is prepared as a ceramic powder material. An additive compound may be added to the ceramic powder material, in accordance with purposes. The additive compound may be an oxide of Mg (magnesium), Mn (manganese), Mo (molybdenum), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni (nickel), Li (lithium), B (boron), Na (sodium), K (potassium) and Si (silicon). The additive compound may be a glass including cobalt, nickel, lithium, boron, sodium, potassium or silicon.

For example, the resulting ceramic powder material is wet-blended with additives and is dried and crushed. Thus, a ceramic material is obtained. For example, the particle diameter may be adjusted by crushing the resulting ceramic material as needed. Alternatively, the grain diameter of the resulting ceramic material may be adjusted by combining the crushing and classifying. With the processes, a dielectric material is obtained.

Figure 5A:
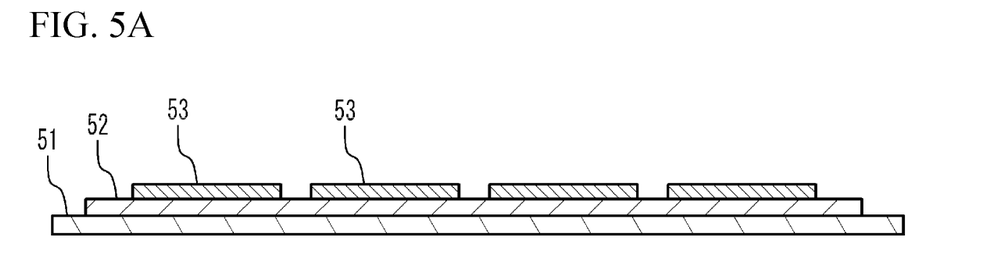
FIG. 5A and FIG. 5B illustrate a stacking process of a first embodiment.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is painted on a base material 51 by, for example, a die coater method or a doctor blade method, and then dried. The base material 51 is, for example, PET (polyethylene terephthalate) film.

Next, as illustrated in FIG. 5A, an internal electrode pattern 53 is formed on the dielectric green sheet 52. In FIG.

5A, as an example, four parts of the internal electrode pattern 53 are formed on the dielectric green sheet 52 and are spaced from each other. The dielectric green sheet 52 on which the internal electrode pattern 53 is formed is a stack unit.

A metal paste of the main component metal of the internal electrode layer 12 is used for the internal electrode pattern 53. The film forming method may be printing, sputtering, vapor deposition or the like.

Figure 5B:
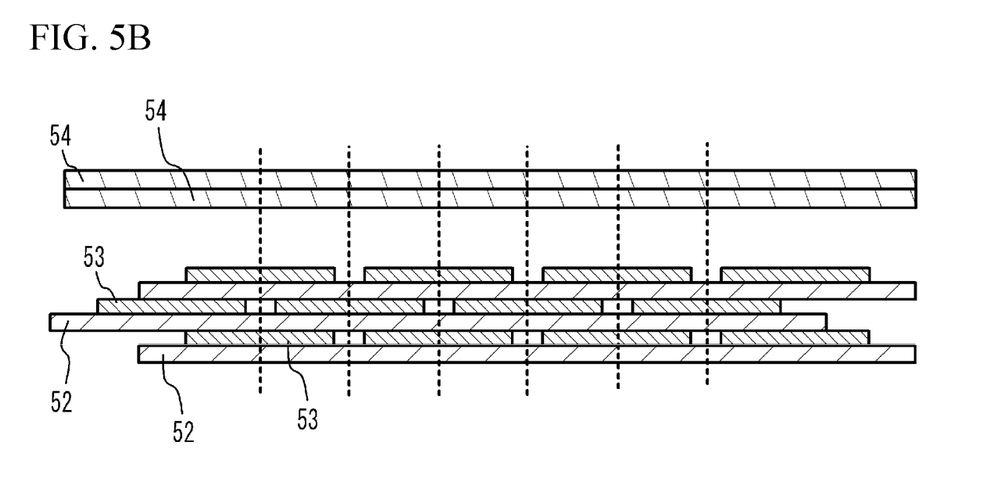

Next, the dielectric green sheets 52 are peeled from the base materials 51. As illustrated in FIG. 5B, the stack units are stacked.

A predetermined number (for example, 2 to 10) of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 5B, the multilayer structure is cut along a dotted line. The components of the cover sheet 54 may be the same as those of the dielectric green sheet 52. Additives of the cover sheet 54 may be different from those of the dielectric green sheet 52.

(Firing process) The binder is removed from the ceramic multilayer structure in $N_2$ atmosphere. A metal paste to be the base layer of the external electrodes 20a and 20b is applied to the both end faces of the ceramic multilayer structure by a dipping method. The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C.

(Annealing process) After the firing step, an annealing process is performed at an atmospheric temperature of 1100° C. to 1200° C. for 30 minutes to 3 hours (for example, 1150° C. for 2 hours). By performing the annealing process, the solid solution of the additive can be promoted in the dielectric layer 11 without causing large grain growth of the dielectric grains. As a result, the Curie point of the dielectric layer 11 is lowered, and the multilayer ceramic capacitor 100 having excellent AC voltage characteristics can be realized. The firing condition for promoting the solid solution of the additive is not limited to this.

(Re-oxidizing process) After that, a re-oxidizing process may be performed in $N_2$ gas atmosphere in a temperature range of 600 degrees C. to 1000 degrees C.

(Plating process) After that, by a plating process, plated layers of Cu, Ni, Sn or the like may be formed on the external electrodes 20a and 20b.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

(Example 1) A model chip of a 10-layer multilayer ceramic capacitor was manufactured. Barium titanate zirconate ($BaTi_{0.98}Zr_{0.02}O_3$), which was the main raw material, was weighed, and various additives and an organic solvent were mixed in a predetermined ratio. As an additive, Ho was added with 1 at % ($Ho_2O_3$), Mn was added with 1 at % ($MnCO_3$), and Si was added with 1 at % ($SiO_2$), when (Zr+Ti) was 100 at %. Wet dispersion was performed by adding zirconia beads having a diameter of 0.5 mm. A dielectric green sheet was applied with the slurry obtained by adding a binder, and a nickel paste kneaded by adding each co-material was printed as an internal electrode pattern. The printing sheets were stacked, crimped and cut. After removing the binder, a metal paste for the base layer of the external electrode was applied, and the mixture was fired in a reducing atmosphere. Further, by performing an annealing treatment (1150° C. for 2 hours) after firing, the solid solution of the additive was promoted without causing large grain growth of the dielectric grains, and the Curie point Tc was lowered. After that, re-oxidation process was performed and the characteristics were evaluated.

The average thickness of the dielectric layer was 1.99 μm. The average thickness of the dielectric layer was calculated by polishing the resin-filled sample, observing the dielectric layer with a laser microscope, and using image analysis software. The AC voltage characteristics were measured with an LCR meter. The measurement frequency was 1 kHz.

(Example 2) In Example 2, ($BaTi_{0.96}Zr_{0.04}O_3$) was used as the main raw material, barium titanate zirconate. Other conditions were the same as in Example 1. The average thickness of the dielectric layer was 1.98 μm.

(Example 3) In Example 3, ($BaTi_{0.92}Zr_{0.08}O_3$) was used as the main raw material, barium titanate zirconate. Other conditions were the same as in Example 1. The average thickness of the dielectric layer was 2.02 μm.

(Example 4) In Example 4, ($BaTi_{0.86}Zr_{0.14}O_3$) was used as the main raw material, barium titanate zirconate. Other conditions were the same as in Example 1. The average thickness of the dielectric layer was 2.03 μm.

(Comparative example) In the comparative example, as the main raw material, barium titanate ($BaTiO_3$) was used instead of barium titanate zirconate. Other conditions were the same as in Example 1. The average thickness of the dielectric layer was 2.01 μm.

TABLE 1

|  | MAIN RAW MATERIAL | AVERAGE THICKNESS (μm) |
| --- | --- | --- |
| EXAMPLE 1 | $BaTi_{0.98}Zr_{0.02}O_3$ | 1.99 |
| EXAMPLE 2 | $BaTi_{0.96}Zr_{0.04}O_3$ | 1.98 |
| EXAMPLE 3 | $BaTi_{0.92}Zr_{0.08}O_3$ | 2.02 |
| EXAMPLE 4 | $BaTi_{0.86}Zr_{0.14}O_3$ | 2.03 |
| COMPARATIVE EXAMPLE | $BaTiO_3$ | 2.01 |

Figure 6:
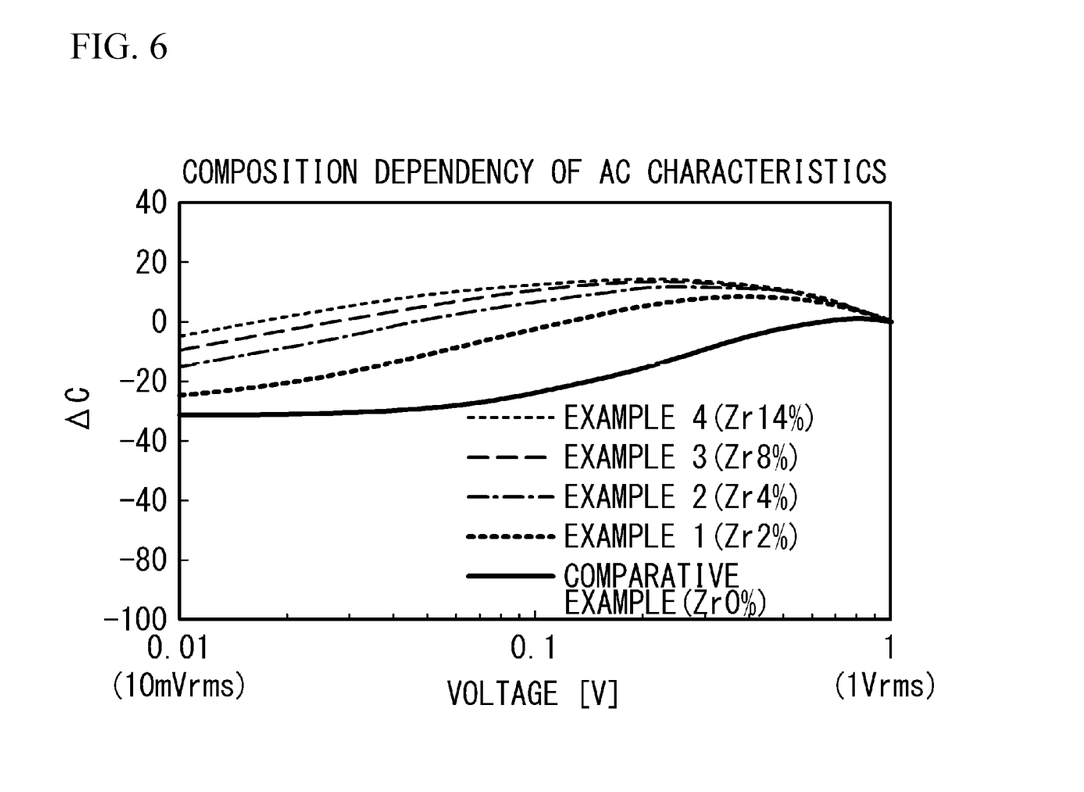
FIG. 6 shows a rate of change of AC voltage characteristics of Examples 1 to 4 and Comparative Example.

FIG. 6 shows the rate of change of AC voltage characteristics of Examples 1 to 4 and Comparative Example. In the comparative example, the capacity tends to decrease as the voltage decreases. On the other hand, in Examples 1 to 4, a capacity peak appeared at 1 Vrms or less, and the larger the amount of zirconium, the more the capacity peak tended to shift to the low electric field side. Along with this, the rate of change in capacity under low voltage (i.e., at 10 mVms) tended to improve. The capacity change rate under the low voltage condition (10 mVms) with respect to the normal measurement condition (1 Vrms) was −31.1% in Comparative Example, −25.0% in Example 1, −14.9% in Example 2, −9.5%, in Example 3 and −4.6% in Example 4. The Curie point Tc was about 95° C. in Comparative Example, but was 80° C. in Example 1, 65° C. in Example 2, 50° C. in Example 3, and 25° C. in Example 4. The temperature characteristics were measured under the condition of 1 kHz-1 Vrms, and the temperature at which the capacity reached the maximum value was determined as the Curie point. The detailed temperature characteristics measurement evaluation method complies with 4.24.1 of JIS C 5101-1. It is considered that these results were due to the fact that the Curie point Tc was lowered and the AC voltage characteristics were improved by the solid solution of zirconium.

Figure 7:
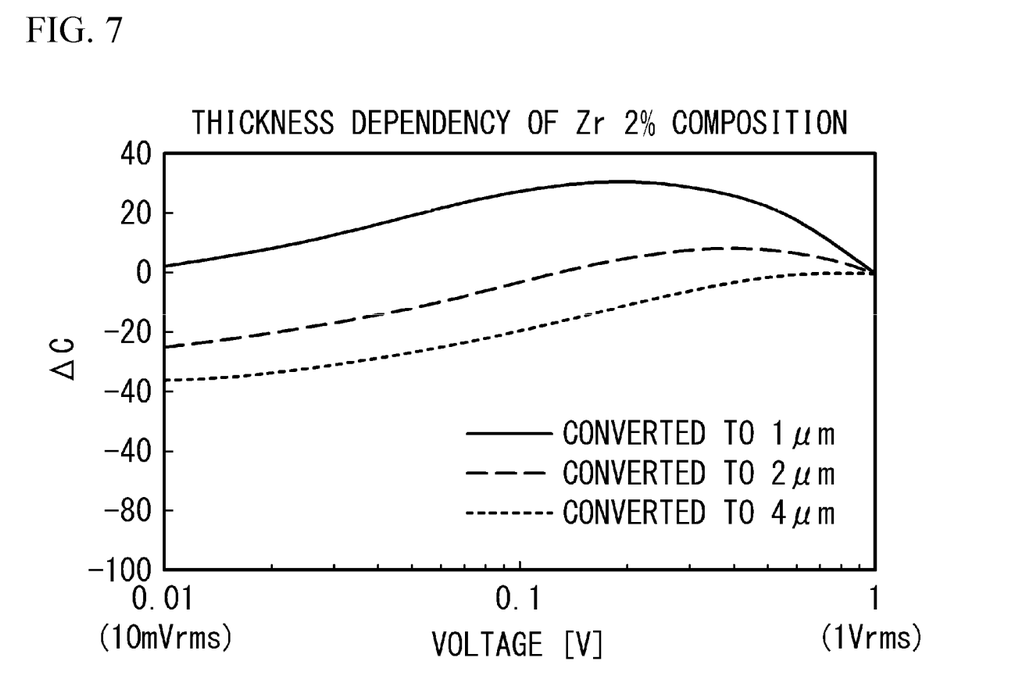
FIG. 7 shows a rate of change in AC voltage characteristics when results of Example 1 are converted into average thicknesses of a dielectric layer (1 μm, 2 μm, 4 μm).

FIG. 7 shows the rate of change in AC voltage characteristics when the results of Example 1 are converted into the average thickness of the dielectric layer (1 µm, 2 µm, 4 µm). Based on the data obtained by measuring the AC voltage dependence of capacitance, (AC voltage after conversion)= ((layer thickness of sample)/(layer thickness to be converted))×(actually applied AC voltage) was calculated. The rate of change was calculated so that AC at the converted AC voltage of 1 Vrms would be 0. The capacity change rate under the low voltage condition (10 mVms) with respect to the normal measurement condition (1 Vrms) was +2.1% when converted to 1 µm, −24.2% when converted to 2 µm, and −35.8% when converted to 4 µm. From these results, it was found that the capacity at low voltage increases as the average thickness decreases, and the capacity under low voltage (10 mVrms) exceeded the capacity under the normal measurement conditions (1 Vrms) at 1 µm or less. Similar results were obtained in Examples 2-4. Therefore, it can be seen that a multilayer ceramic capacitor whose capacity under low voltage (10 mVrms) exceeded the capacity under the normal measurement conditions (1 Vrms) could be realized when a dielectric layer contained barium titanate zirconate as the main component, contained 2 at % or more and 14 at % or less of zirconium with respect to the total of titanium and zirconium, had a Curie point of less than 85° C., and the average thickness of the dielectric layer was 1 µm or less.

On the other hand, as the amount of zirconium increases, the peak capacity tended to shift to a lower electric field, but barium titanate zirconate with a grain size of 1 µm or less tended to have a lower relative permittivity. The relative permittivity of barium titanate used in Comparative Example was 3200, but the relative permittivity of $BaTi_{0.98}Zr_{0.02}O_3$ used in Example 1 was 2900, the relative permittivity of $BaTi_{0.96}Zr_{0.04}O_3$ used in Example 2 was 2500, the relative permittivity of $BaTi_{0.92}Zr_{0.08}O_3$ used in Example 3 was 2000, and the relative permittivity of $BaTi_{0.86}Zr_{0.14}O_3$ used in Example 4 was about 1600. From the viewpoint of increasing the dielectric constant and increasing the capacity at low voltage, it can be seen that the amount of zirconium added to the total of titanium and zirconium is preferably 8 at % or less.

Although the embodiments of the present invention have been described in detail, it is to be understood that the various change, substitutions, and alterations could be made hereto without departing from the spirit and scope of the invention.

What is claimed is:

1. A multilayer ceramic electronic device comprising:
a plurality of internal electrode layers that face each other; and
a plurality of dielectric layers, each of which is sandwiched by two of the plurality of internal electrode layers,
wherein a main component of the plurality of dielectric layers is barium titanate zirconate,
wherein in each of the plurality of dielectric layers, an amount of zirconium is 2 at % or more and 14 at % or less with respect a total amount of titanium and zirconium,
wherein Curie point of the plurality of dielectric layers is in a range of 65 degrees C. or more and 80 degrees or less, and
wherein an average thickness of each of the plurality of dielectric layers is 1 µm or less.

2. The multilayer ceramic electronic device as claimed in claim 1, wherein the amount of zirconium in the plurality of dielectric layers is 8 at % or less with respect the total amount of titanium and zirconium.

3. The multilayer ceramic electronic device as claimed in claim 1, wherein a capacity of the multilayer ceramic electronic device at 10 mVrms is larger than that at 1 Vrms under an AC voltage condition.

4. The multilayer ceramic electronic device as claimed in claim 1, wherein the plurality of dielectric layers include manganese, silicon, or a rare earth element.

5. The multilayer ceramic electronic device as claimed in claim 1, wherein in each of the plurality of dielectric layers, the amount of zirconium is 4 at % or more and 8 at % or less with respect the total amount of titanium and zirconium.

6. The multilayer ceramic electronic device as claimed in claim 1, wherein in each of the plurality of dielectric layers, the amount of zirconium in the capacity section is 2 at % or more and 4 at % or less with respect the total amount of titanium and zirconium.

7. A multilayer ceramic electronic device comprising:
a multilayer chip having a plurality of internal electrode layers that face each other and a plurality of dielectric layers, each of which is sandwiched by two of the plurality of internal electrode layers, the plurality of dielectric layers forming a capacity section in which the plurality of internal electrode layers face each other; and
an external electrode that is provided on a face of the multilayer chip and is electrically connected to a part of the plurality of internal electrode layers,
wherein a main component of the plurality of dielectric layers is barium titanate zirconate,
wherein in each of the plurality of dielectric layers, an amount of zirconium in the capacity section is 2 at % or more and 14 at % or less with respect a total amount of titanium and zirconium,
wherein Curie point of the plurality of dielectric layers in the capacity section is in a range of 65 degrees C. or more and 80 degrees or less, and
wherein an average thickness of each of the plurality of dielectric layers is 1 µm or less.

8. The multilayer ceramic electronic device as claimed in claim 7, wherein the amount of zirconium in the plurality of dielectric layers in the capacity section is 8 at % or less with respect the total amount of titanium and zirconium.

9. The multilayer ceramic electronic device as claimed in claim 7, wherein a capacity of the multilayer ceramic electronic device at 10 mVrms is larger than that at 1 Vrms under an AC voltage condition.

10. The multilayer ceramic electronic device as claimed in claim 7, wherein the plurality of dielectric layers in the capacity section include manganese, silicon, or a rare earth element.

11. The multilayer ceramic electronic device as claimed in claim 7, wherein in each of the plurality of dielectric layers, the amount of zirconium in the capacity section is 4 at % or more and 8 at % or less with respect the total amount of titanium and zirconium.

12. The multilayer ceramic electronic device as claimed in claim 7, wherein in each of the plurality of dielectric layers, the amount of zirconium in the capacity section is 2 at % or more and 4 at % or less with respect the total amount of titanium and zirconium.

\* \* \* \* \*